US012596817B2

(12) United States Patent
Watson et al.

(10) Patent No.: US 12,596,817 B2
(45) Date of Patent: Apr. 7, 2026

(54) SECURE REMOTE CONTROLS PACKAGE FOR SEMI-AUTONOMOUS SYSTEMS

(71) Applicant: The Texas A&M University System, College Station, TX (US)

(72) Inventors: Daniel Watson, College Station, TX (US); Pavel Tsvetkov, College Station, TX (US)

(73) Assignee: The Texas A&M University System, College Station, TX (US)

( * ) Notice: Subject to any disclaimer, the term of this patent is extended or adjusted under 35 U.S.C. 154(b) by 342 days.

(21) Appl. No.: 18/533,592

(22) Filed: Dec. 8, 2023

(65) Prior Publication Data

US 2025/0190590 A1     Jun. 12, 2025

(51) Int. Cl.
G06F 21/60         (2013.01)
G06F 21/72         (2013.01)

(52) U.S. Cl.
CPC .......... G06F 21/602 (2013.01); G06F 21/606 (2013.01); G06F 21/72 (2013.01)

(58) Field of Classification Search
CPC ....... G06F 21/602; G06F 21/606; G06F 21/72
See application file for complete search history.

(56) References Cited

U.S. PATENT DOCUMENTS

| | | | |
|---|---|---|---|
| 4,948,552 A | 8/1990 | Mollot | |
| 4,962,360 A | 10/1990 | Homma | |
| 5,275,060 A | 1/1994 | Lynnworth | |
| 5,280,728 A | 1/1994 | Sato et al. | |
| 5,440,930 A | 8/1995 | Daire et al. | |
| 5,519,330 A | 5/1996 | Yamauchi | |
| 5,824,915 A | 10/1998 | Hujzer et al. | |

(Continued)

FOREIGN PATENT DOCUMENTS

| | | |
|---|---|---|
| CA | 2816935 | 5/2023 |
| CA | 2995604 | 9/2023 |

(Continued)

*Primary Examiner* — Matthew T Henning
(74) *Attorney, Agent, or Firm* — King & Spalding LLP

(57)                ABSTRACT

A secure system for sending and receiving remote signals that control semiautonomous critical systems and infrastructure. The secure system includes a plurality of independent operator stations to provide command signals to the remote critical systems and infrastructure by means of wired and/or wireless communications. Decoupling of the secure system from raw signals is performed by a data broker that serves to check for time-dependent and signal-dependent corroboration between the raw signals and then provide limited-scope instructions to the secure system controller. Further security is afforded to the secure system through encryption of the incoming command signals, convoluting the encrypted command signals within data structures, and padding with erroneous information with the implementation of a synthesized command signal that renders successfully decrypted and deconvoluted command signals neither readable by humans or machines. The final method of data security is appropriated through the synthesis of transmitter/receiver unique "languages" that serve to translate decrypted and unconvoluted signals into their final human/machine readable instructions.

20 Claims, 10 Drawing Sheets

(56)　　　　　References Cited

U.S. PATENT DOCUMENTS

| | | | |
|---|---|---|---|
| 6,047,602 | A | 4/2000 | Lynnworth |
| 6,278,281 | B1 | 8/2001 | Bauer |
| 6,799,475 | B2 | 10/2004 | Van Klooster |
| 6,895,823 | B1 | 5/2005 | Herrmann et al. |
| 7,088,932 | B2 | 8/2006 | Chou |
| 7,093,502 | B2 | 8/2006 | Kupnik et al. |
| 7,322,251 | B2 | 1/2008 | Gysling et al. |
| 7,334,452 | B2 | 2/2008 | Matziev |
| 7,343,821 | B2 | 3/2008 | Panicke et al. |
| 7,707,987 | B2 | 5/2010 | Guthrie |
| 8,238,509 | B2 | 8/2012 | Moen et al. |
| 8,648,605 | B2 | 2/2014 | Nakamura |
| 8,767,905 | B2 | 7/2014 | Neeley et al. |
| 8,844,347 | B2 | 9/2014 | Electric |
| 8,893,558 | B2 | 11/2014 | Davis et al. |
| 8,968,547 | B2 | 3/2015 | Loewen et al. |
| 9,008,257 | B2 | 4/2015 | Hyde et al. |
| 9,074,922 | B2 | 7/2015 | Dayal et al. |
| 9,224,507 | B2 | 12/2015 | Heinold et al. |
| 9,234,777 | B2 | 1/2016 | Ao et al. |
| 9,251,920 | B2 | 2/2016 | Loewen et al. |
| 9,295,923 | B2 | 3/2016 | Mexheritsky et al. |
| 9,302,226 | B2 | 4/2016 | Loewen et al. |
| 9,324,465 | B2 | 4/2016 | Splichal, Jr. |
| 9,368,238 | B2 | 6/2016 | Theofanous et al. |
| 9,368,241 | B2 | 6/2016 | Loewen et al. |
| 9,460,818 | B2 | 10/2016 | Bergman |
| 9,557,200 | B2 | 1/2017 | Forster |
| 9,664,543 | B2 | 5/2017 | Twedowski et al. |
| 9,691,507 | B2 | 6/2017 | Hyde et al. |
| 9,691,508 | B2 | 6/2017 | Hyde et al. |
| 9,720,171 | B2 | 8/2017 | Arai |
| 9,748,006 | B2 | 8/2017 | Hyde et al. |
| 9,761,336 | B2 | 9/2017 | Caine et al. |
| 9,761,337 | B2 | 9/2017 | Hyde et al. |
| 9,778,218 | B2 | 10/2017 | Barham |
| 9,799,417 | B2 | 10/2017 | Hyde et al. |
| 9,833,648 | B2 | 12/2017 | Loewen et al. |
| 9,875,817 | B2 | 1/2018 | Edwards et al. |
| 9,875,818 | B2 | 1/2018 | Reed et al. |
| 9,921,158 | B2 | 3/2018 | Rider |
| 9,968,899 | B1 | 5/2018 | Gellaboina et al. |
| 10,041,163 | B1 | 8/2018 | Offer et al. |
| 10,056,160 | B2 | 8/2018 | LeBlanc |
| 10,290,381 | B2 | 5/2019 | Caine et al. |
| 10,309,813 | B2 | 6/2019 | Gestner |
| 10,359,351 | B2 | 7/2019 | Spencer |
| 10,438,705 | B2 | 10/2019 | Cheatham, III |
| 10,497,480 | B2 | 12/2019 | Cheatham, III et al. |
| 10,515,729 | B2 | 12/2019 | Horn et al. |
| 10,566,096 | B2 | 2/2020 | Czerwinski |
| 10,650,934 | B2 | 5/2020 | Caine et al. |
| 10,665,356 | B2 | 5/2020 | Abbott |
| 10,734,122 | B2 | 8/2020 | Cisneros, Jr. |
| 10,741,293 | B2 | 8/2020 | Abbott |
| 10,755,822 | B2 | 8/2020 | Gibbons et al. |
| 10,825,571 | B2 | 11/2020 | Edwards et al. |
| 10,876,871 | B2 | 12/2020 | Head |
| 10,937,557 | B2 | 3/2021 | Sineath et al. |
| 10,962,461 | B2 | 3/2021 | Linneen |
| 11,031,140 | B2 | 6/2021 | Hunt et al. |
| 11,043,309 | B2 | 6/2021 | Nygaard et al. |
| 11,049,624 | B2 | 6/2021 | Loewen et al. |
| 11,075,013 | B2 | 7/2021 | Abbott et al. |
| 11,075,015 | B2 | 7/2021 | Cisneros, Jr. |
| 11,145,424 | B2 | 10/2021 | Abbott |
| 11,149,623 | B2 | 10/2021 | Kutsch et al. |
| 11,200,991 | B2 | 12/2021 | LeBlanc |
| 11,342,084 | B2 | 5/2022 | Cheatham, III et al. |
| 11,342,085 | B2 | 5/2022 | Hinds |
| 11,367,536 | B2 | 6/2022 | Abbott |
| 11,373,765 | B2 | 6/2022 | Czerwinski |
| 11,373,769 | B2 | 6/2022 | Hinds |
| 11,380,450 | B2 | 7/2022 | Sineath et al. |
| 11,417,435 | B2 | 8/2022 | Nelson |
| 11,428,564 | B2 | 8/2022 | Dayal et al. |
| 11,443,859 | B2 | 9/2022 | Bass et al. |
| 11,482,345 | B2 | 10/2022 | Hunt et al. |
| 11,488,731 | B2 | 11/2022 | Abbott |
| 11,569,000 | B2 | 1/2023 | Hinds |
| 11,626,213 | B2 | 4/2023 | Regan et al. |
| 2004/0093957 | A1 | 5/2004 | Buess |
| 2009/0046825 | A1 | 2/2009 | Dulka et al. |
| 2010/0082995 | A1* | 4/2010 | Dees ..................... G06F 3/0625 |
| | | | 713/178 |
| 2012/0054499 | A1 | 3/2012 | Eklund |
| 2012/0082911 | A1 | 4/2012 | Hyde et al. |
| 2012/0082913 | A1 | 4/2012 | Hyde et al. |
| 2012/0087455 | A1 | 4/2012 | Hyde et al. |
| 2013/0054467 | A1 | 2/2013 | Dala |
| 2013/0199305 | A1 | 8/2013 | Faermald |
| 2014/0123768 | A1 | 5/2014 | Ao et al. |
| 2014/0281484 | A1 | 9/2014 | Kurkowski |
| 2015/0039900 | A1 | 2/2015 | Kawakami |
| 2015/0107371 | A1 | 4/2015 | Khrakovsky |
| 2016/0334255 | A1 | 11/2016 | Gestner |
| 2017/0294241 | A1 | 10/2017 | Dodson et al. |
| 2017/0294242 | A1 | 10/2017 | Simpson et al. |
| 2017/0301416 | A1 | 10/2017 | Hansen |
| 2017/0358374 | A1 | 12/2017 | Loewen et al. |
| 2018/0254109 | A1 | 9/2018 | Cheatham, III et al. |
| 2019/0015806 | A1 | 1/2019 | Gellaboina et al. |
| 2019/0057783 | A1 | 2/2019 | LeBlanc |
| 2019/0139665 | A1 | 5/2019 | Czerwinski et al. |
| 2019/0376930 | A1 | 12/2019 | Arbault |
| 2020/0161015 | A1 | 5/2020 | Czerwinski et al. |
| 2021/0287814 | A1 | 9/2021 | Loewen et al. |
| 2021/0302295 | A1 | 9/2021 | Linneen |
| 2021/0304909 | A1 | 9/2021 | Gramlich et al. |
| 2021/0318673 | A1 | 10/2021 | Kitchen et al. |
| 2021/0343431 | A1 | 11/2021 | Cisneros, Jr. |
| 2021/0348960 | A1 | 11/2021 | Cheung |
| 2022/0005619 | A1 | 1/2022 | Cisneros, Jr. |
| 2022/0051820 | A1 | 2/2022 | Corbin |
| 2022/0084702 | A1 | 3/2022 | Loewen et al. |
| 2022/0310281 | A1 | 9/2022 | Czerwinski |
| 2023/0097195 | A1 | 3/2023 | Ohtsu |
| 2023/0168268 | A1 | 6/2023 | Keller |
| 2023/0326619 | A1 | 10/2023 | Snead |
| 2023/0358582 | A1 | 11/2023 | Bramsen |
| 2024/0127978 | A1 | 4/2024 | Lang |
| 2025/0079027 | A1 | 3/2025 | Cheatam |
| 2025/0103013 | A1 | 3/2025 | Rivas |
| 2025/0104880 | A1 | 3/2025 | Kanen |
| 2025/0139257 | A1* | 5/2025 | Alsharif ................ G06F 21/602 |
| 2025/0190590 | A1 | 6/2025 | Watson |

FOREIGN PATENT DOCUMENTS

| | | |
|---|---|---|
| CN | 2646670 | 10/2004 |
| CN | 106643924 | 5/2017 |
| CN | 114974630 | 8/2022 |
| CN | 115420391 | 12/2022 |
| CN | 115436402 | 12/2022 |
| DE | 4124692 | 1/1993 |
| EP | 2624359 | 8/2013 |
| EP | 3335187 | 12/2023 |
| EP | 3990165 | 4/2025 |
| EP | 4534194 | 4/2025 |
| GB | 2061510 | 3/1981 |
| JP | 2010185785 | 8/2010 |
| WO | WO 1992/000507 | 1/1992 |
| WO | WO 2015/017928 | 2/2015 |
| WO | WO 2015096901 | 7/2015 |
| WO | WO 2017/032379 | 3/2017 |
| WO | WO 2018/009433 | 1/2018 |
| WO | WO 2017/199059 | 2/2018 |
| WO | WO 2018/026536 | 2/2018 |
| WO | WO 2018/027170 | 2/2018 |
| WO | WO 2018/213669 | 11/2018 |
| WO | WO 2022235973 | 11/2022 |

* cited by examiner

SECURE REMOTE CONTROLS PACKAGE FOR SEMI-AUTONOMOUS SYSTEMS

TECHNICAL FIELD

The described examples relate generally to systems, devices, and techniques for providing a secure framework for remotely controlling systems, and, more particularly, for utilizing cryptographic algorithms to ensure command signal security in a system for controlling semiautonomous critical systems and infrastructure.

BACKGROUND

Semiautonomous critical systems and infrastructure play a significant role in modern society, from managing nuclear reactors to overseeing power grids and other mission-critical operations. Normally, these systems are situated in remote or geographically isolated locations, far from urban areas where control centers or expert personnel are typically based. Under these isolated settings, it is very important to ensure the safe and efficient operations of such critical systems and infrastructure. Therefore, it is essential to establish a secure and reliable remote control system to provide continuous and responsive communications between on-site personnel and off-site control centers.

However, the geographical separation inevitably introduces significant challenges in maintaining a communication link, which is vital for monitoring and managing the critical systems and infrastructure effectively. For example, any communication breakdown could have serious consequences in the case of nuclear reactors. In addition, the necessity for secure remote control systems is further accentuated by the increasing prevalence of cyber threats. Various malicious actors, ranging from state-sponsored hackers to criminal organizations and even lone wolves, may pose a significant risk to the critical systems and infrastructure. These systems are not only valuable targets but also potential sources of great harms if compromised. For example, a cyberattack on a nuclear reactor system may cause catastrophic damage for human safety and environment, resulting in far-reaching societal consequences.

To mitigate these cyber threats and ensure the reliability of commands sent to the critical systems and infrastructure, it is vital to build a secure control system with robust encryption and authentication mechanisms. With the advent of quantum computing, however, there exists a real concern over the potential obsoletion of conventional encryption. Therefore, developing a quantum-resistant cryptographic methodology has become a major R&D activity. In order to safeguard the confidentiality and integrity of data transmitted over the communication link, a framework of robust high-entropy (disorder) encryption methods must be exercised into transmitted signals. With a cryptographic framework of these aforementioned traits, even if data is intercepted, encryption algorithms can guarantee that the data will remain unintelligible to unauthorized parties. This means that command operations and any other sensitive information sent between the on-site personnel and off-site control centers can still remain secure in the remote control system. Authentication, on the other hand, is normally performed at receiver side to confirm the legitimacy of users and systems attempting to access the critical systems and infrastructure. Multi-factor authentication, biometrics, and other strong authentication mechanisms can prevent unauthorized access and impersonation. In the case of a nuclear reactor system, this guarantees that only authorized users can issue command operations and make critical decisions.

Despite the progress made in securing remote communication and control for the critical systems and infrastructure, there remains a need for improved communication and control systems which can more effectively mitigate against ever-evolving cyber threats and increasing sophisticated malicious attacks. The present invention proposes a secure communication and control framework to control the semi-autonomous critical systems and infrastructure remotely.

SUMMARY

In one example, a secure system for sending and receiving command signals that control semiautonomous critical systems and infrastructure is disclosed. The security for the system is achieved through multiple tiers of defenses. First, the secure system performs one or more data operations (including translation and encryption processes) at the transmitter side to scramble the data of each command signal. The translated command signal is a human/machine unreadable language, which is uniquely programmed to each transmitter and receiver pair and has no correlation to any human and machine instructions. The encrypted command signal can only be deciphered or decrypted by applying appropriated decryption key(s). In this regard, even if the command signal may be intercepted by malicious actors, as long as they do not have the specific transmitter and receiver pair to understand the human/machine unreadable language or know the corresponding decryption key(s), the command signal being transmitted remain confidential. Moreover, the secure system purposes convolution operations to embed the encrypted command signal across different locations within a file with a larger data structure (e.g., an image file). The locations of the embedded command data (e.g., the encrypted command signal) can be a function of timestamp, context, and one or more tokens, which may further decrease the correlation between command data and raw transmitted signal and make it more difficult to be intercepted and detected. Furthermore, the secure system also embeds one or more tokens in the command signal to verify the legitimacy of the command signal or communicate additional operational information, providing a basis to combat against forgery attacks, such as command signals sent from some impersonators. The secure system includes receivers that decrypt, deconvolute, and translate the transmissions into machine instructions, while performing authentication and user-specified analysis to the signals locally, in a discreet receiver, before signaling a bus gate to open the communications path by closing a switch in series with a resistor on a low-voltage supervised circuit, thereby introducing a measurable and configured resistance that correlates which receivers are activated. Bus gates continuously monitor resistors across the system to maintain omniscience across all receivers, which when used in conjunction with tertiary embedded tokens provides a basis for early comprise detection and fault diagnosis among the receivers. In addition, the secure system uses redundant communication buses to reduce the impact of single point of failure, such as connection failure in individual communication paths or reception of manipulated command signal from the malicious actor, so that it can increase system reliability and fault tolerance. In particular, each communication bus will connect with one or more receivers and proceed the command signals with their authenticity tokens. Ultimately, the secure system is configured to evaluate the command signals from the redundant communication buses and use a majority voting approach to decide which action should be taken based on the authenticity tokens.

In some examples, the secure system comprises a plurality of operator stations, a plurality of field receivers, and a data broker.

Each operator station is configured to encrypt and transmit a command signal by translating the command signal and its associated timestamp from a first format to a second format, embedding the translated timestamp into the translated command signal, encrypting the embedded command signal into a first binary sequence with a first cryptographic algorithm, convoluting the first binary sequence within an image file, encrypting the image file into a second binary sequence with a second cryptographic algorithm, and sending the second binary sequence over a communication link in a digital communication system. In one example, encrypting the embedded command signal with the first cryptographic algorithm is optional. In another example, encrypting the embedded command signal with the second cryptographic algorithm is optional.

In an analog communication system, each operator station is further configured to convert the second binary sequence to an analog signal and then send the analog signal over a communication link.

Each field receiver is configured to receive and decrypt the command signal by receiving a signal containing the command signal over the communication link in the digital communication system, decrypting the received signal with the second cryptographic algorithm, deconvoluting the decrypted signal from an image file to retrieve an embedded data including the command signal, decrypting the embedded data with the first cryptographic algorithm, and recovering the command signal, timestamp, and relevant tokens from the decrypted embedded data. In one example, decrypting the embedded command signal with the second cryptographic algorithm is optional. In another example, decrypting the embedded command signal with the second cryptographic algorithm is optional.

In an analog communication system, each field receiver is configured to convert the received signal from an analog signal to a digital signal before decrypting it with the second cryptographic algorithm.

The data broker is configured to connect with the plurality of field receivers with a supervised circuit, wherein the supervised circuit comprises a plurality of resistors associated with the plurality of field receivers, a plurality of bus gates associated with the plurality of resistors, and a plurality of redundant communication buses associated with the plurality of bus gates. The data broker is then configured to receive a plurality of recovered command signals from the plurality of field receivers and process the plurality of recovered command signals by using a majority rule.

In some examples, the first cryptographic algorithm and the second cryptographic algorithm are selected from at least one of the cryptographic algorithms used in secret key cryptography, public key cryptography, quantum cryptography, and hash function. Some example cryptographic algorithms may be symmetric key cryptographic algorithm like Advanced Encryption Standard (AES) and asymmetric key cryptographic algorithm like Rivest-Shamir-Adleman (RSA).

In another example, the first format of the command signal is a human-readable format and the second format is a human-unreadable format. The human-unreadable format enhances security and confidentiality of the command signal because it has no observable and translatable relationship to the command signal. The translation of the command signal to a human/machine-unreadable language, unique to each transmitter and receiver pair, will bear no correlation to the human/machine-readable signals.

In another example, each operator station is further configured to pad erroneous data that includes human-readable subterfuges in at least one of the command signal, the translated command signal, the embedded command signal, the first binary sequence; the image file, and the second binary sequence. As described herein, subterfuges may refer to any irrelevant content, such as extra character(s), meaningless word(s) or phrase(s), or other obfuscated element(s), to confuse and mislead malicious actors who try to intercept and decrypt the transmitted signal.

In another example, each operator station is further configured to embed an authenticity token within the command signal to initiate a hardware-based authentication process. The authenticity token is used to verify the legitimacy of the received command signal.

In another example, each operator station is configured to embed the command signal across one or more locations within the image file. The one or more locations of the command signal embedded in the image file are based on timestamp, signal context, and one or more tokens. More concisely, the embedded command signal will not be in the same place in each convolution. This may decrease likelihood of successful interception.

In another example, each operator station is configured to embed one or more tokens within the command signal and across one or more locations within the image file. The tokens may be used by each field receiver to authenticate the legitimacy of the received command signal.

In another example, each field receiver, upon the receipt of the one or more tokens within the command signal, close its onboard switch to introduce measured resistance in the supervised circuit and connects to the plurality of redundant communication buses for command propagation. The plurality of redundant communication buses can provide redundant command signals to ensure continuous and uninterrupted communications. In this regard, the redundancy can improve overall system reliability and enhance system security by reducing impact of single point of failure, such as a cable break or a component failure in individual communication link.

In another example, each of the plurality of resistors has a unique value.

In one another example, a method of securely sending command signals by an operator station is disclosed. The method comprises translating a command signal and its associated timestamp from a first format to a second format, embedding the translated timestamp into the translated command signal, encrypting the embedded command signal into a first binary sequence with a first cryptographic algorithm, convoluting the first binary sequence within an image file, encrypting the image file into a second binary sequence with a second cryptographic algorithm, and sending the second binary sequency over a communication link in a digital communication system, wherein the communication link is established by the operator station and a field receiver.

In an analog communication system, the method further comprises converting the second binary sequence to an analog signal and sending the analog signal over a communication link.

In another example, the operator station encrypts the command signal with the first cryptographic algorithm and the second cryptographic algorithm which are selected from at least one of the cryptographic algorithms used in secret key cryptography, public key cryptography, quantum cryptography, and hash function. Some example cryptographic algorithms may be symmetric key cryptographic algorithm like Advanced Encryption Standard (AES) and asymmetric key cryptographic algorithm like Rivest-Shamir-Adleman (RSA).

In one another example, a method of securely receiving and decrypting command signals by a field receiver is disclosed. The method comprises receiving a signal containing a command signal over a communication link in a digital communication system, decrypting the signal with a first cryptographic algorithm, deconvoluting the decrypted signal from an image file to retrieve an embedded data including the command signal, decrypting the embedded data with a second cryptographic algorithm wherein the decrypted embedded data is in human-unreadable format, and recovering the command signal and timestamp in human-readable format from the decrypted embedded data.

In an analog communication system, the method comprises converting the received signal from an analog signal to a digital signal before decrypting it with the second cryptographic algorithm.

In another example, the method may further comprise connecting a plurality of field receivers to a data broker with a supervised circuit, wherein the supervised circuit comprises a plurality of resistors associated with the plurality of field receivers, a plurality of bus gates associated with the plurality of resistors, and a plurality of redundant communication buses associated with the plurality of bus gates. Then the method may include receiving a plurality of recovered command signals from the plurality of field receivers at the data broker and processing the plurality of recovered command signals by using a majority rule.

In another example, the first cryptographic algorithm used in the field receiver is the same as the second cryptographic algorithm used in the operator station and the second cryptographic algorithm used in the field receiver is the same as the first cryptographic algorithm used in the operator station. The first cryptographic algorithm and the second cryptographic algorithm are selected from at least one of the cryptographic algorithms used in secret key cryptography, public key cryptography, quantum cryptography, and hash function. Some example cryptographic algorithms may be symmetric key cryptographic algorithm like Advanced Encryption Standard (AES) and asymmetric key cryptographic algorithm like Rivest-Shamir-Adleman (RSA).

In addition to the example aspects described above, further aspects and examples will become apparent by reference to the drawings and by study of the following description.

Figure 1:
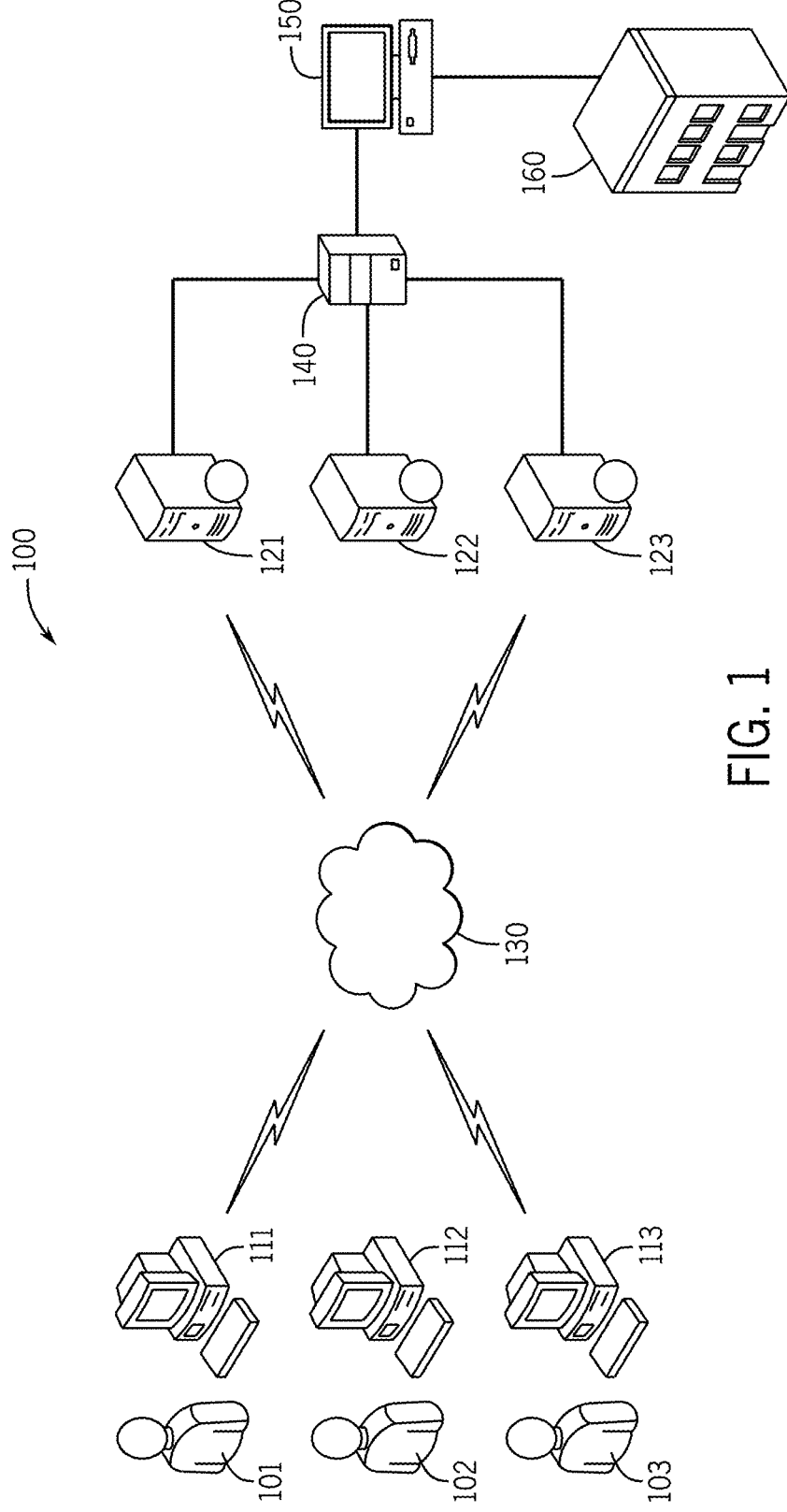
FIG. 1 depicts a schematic block diagram of an example secure system for controlling semiautonomous critical systems and infrastructure.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

The description that follows includes sample systems, methods, and apparatuses that embody various elements of the present disclosure. However, it should be understood that the described disclosure may be practiced in a variety of forms in addition to those described herein.

The following disclosure relates generally to a secure system capable of sending and receiving remote signals that control semiautonomous critical systems and infrastructure. For example, the secure system may be used with semiautonomous nuclear reactor systems. Such semiautonomous nuclear reactor systems may be positioned in remote locations with limited supporting infrastructure and personnel and/or may be distributed throughout the national grid infrastructure to reduce the likelihood of localized generation problems. Cyber-attack may hinder the deployment of such systems, and so it may be desirable to utilize the secure system to satisfy the security requirements for controlling the remote nuclear reactor systems.

To mitigate the foregoing hinderances, operations of the nuclear reactor systems, as disclosed herein, can be initiated and controlled by a plurality of independent operator stations in the secure system by means of wired and/or wireless communications. In this regard, the "bad actor" scenarios may only result in a single compromised operation channel, wherein the remaining operator stations can proceed with nominal operations. As described in greater detail herein, decoupling of the secure system from raw command signals may be performed by a data broker that serves to check for time-dependent and signal-dependent corroboration between the raw command signals and then to provide limited-scope instructions to the secure system controller. In an environment with the potential of varied cyber-attacks, further security may be afforded to the secure system through encryption of the incoming command signals, convoluting the encrypted command signals within an image file, and padding with erroneous information with the implementation of a synthesized command signal that renders successfully decrypted and deconvoluted command signals neither readable by human nor conventional machines.

In accordance with various embodiments of the present disclosure, the secure system may apply multiple tiers of cryptography for security purpose. For example, a command signal, which is usually a human-readable plain text, is usually first translated into a human/machine-unreadable language. The human/machine-unreadable language is unique to each transmitter and receiver pair and bears no correlation to any human or machine-readable instructions. Then, the translated signal can be encrypted. A plurality of cryptographic algorithms are used to encrypt the command signals for ensuring the signal security. They may be selected from the ones used in secret key cryptography, public key cryptography, quantum cryptography, and hash function. Some example cryptographic algorithms include symmetric key cryptographic algorithm like Advanced Encryption Standard (AES) and asymmetric key cryptographic algorithm like Elliptic Curve Cryptography (ECC) and Rivest-Shamir-Adleman (RSA).

In addition, the encrypted command signals can be further convoluted within any other file with a larger data structure, such that the command signals may be nested in the larger data structure in two or more dimensions and may be transmitted covertly. By doing so, the file with a larger data structure may conceal the command signals and protected them from eavesdropping and interception by adversaries. The file with a larger data structure includes, but is not limited to image, video, audio and text files.

Furthermore, the transmission of the encrypted command signals may be padded by erroneous data, such as human-readable subterfuge data. The subterfuge data may refer to any content, such as extra character(s), meaningless word(s) or phrase(s), or other obfuscated element(s), that appears to be part of the command signals in communication. It is introduced to mislead or confuse potential malicious actors and make it more challenging for them to decipher, tamper with, or manipulate the command signals. In this regard, the erroneous data may enhance security and privacy of the transmission of the encrypted command signals in the secure system.

Turning to the Drawings, with reference to FIG. 1, a schematic block diagram illustrates an example secure system 100 that controls semiautonomous critical systems and infrastructure in accordance with some embodiments of the present disclosure. The secure system 100 includes a plurality of operator stations 111-113 and a plurality of field receivers 121-123. Each operator station is operated within a physically and digitally secure environment, where the operator station is neither networked nor provided with external communications buses (i.e., USB). In an alternative example, each operator station 111-113 and each field receiver 121-123 can be a pair of hardware-devices designed with unidirectional data flow, so that it may create a physically secure one-way communication channel. The operator stations 111-113 receive operations for the remote semiautonomous critical systems and infrastructure from a plurality of users 101-103, respectively. Then they convert the operations into encrypted command signals and transmit them on public communications infrastructures 130 through a plurality of communication paths. The plurality of communication paths may provide transmission redundancy and resistance in frequency, temporal, and/or spatial domains to combat interference attacks.

Without loss of generality, the public communications infrastructures 130 can be wired, wireless, or a combination of both. In some embodiments, the wired public communications infrastructures 130 may include Internet, fiber-optic communication, and public switched telephone network (PSTN). The wireless public communications infrastructures 130 may include Wi-Fi, GSM, CDMA, 4G LTE, and 5G.

The plurality of field receivers 121-123 are located with the semiautonomous critical systems and infrastructure. They receive and recover the command signals from the public communications infrastructures 130. The secure system also includes a data broker 140 associated with the plurality of field receivers 121-123 in a supervised circuit, wherein the supervised circuit provides a means of determining the status of the field receivers. The data broker 140 will receive the recovered command signals from the plurality of field receivers and decide the corresponding operations for the semiautonomous critical systems and infrastructure 160. In general, the plurality of users will initiate and send the same operation command through the plurality of communication paths. The data broker 140 applies a majority rule to obtain an agreement among the operator stations and send an operation command to the semiautonomous critical systems and infrastructure 160.

Figure 2:
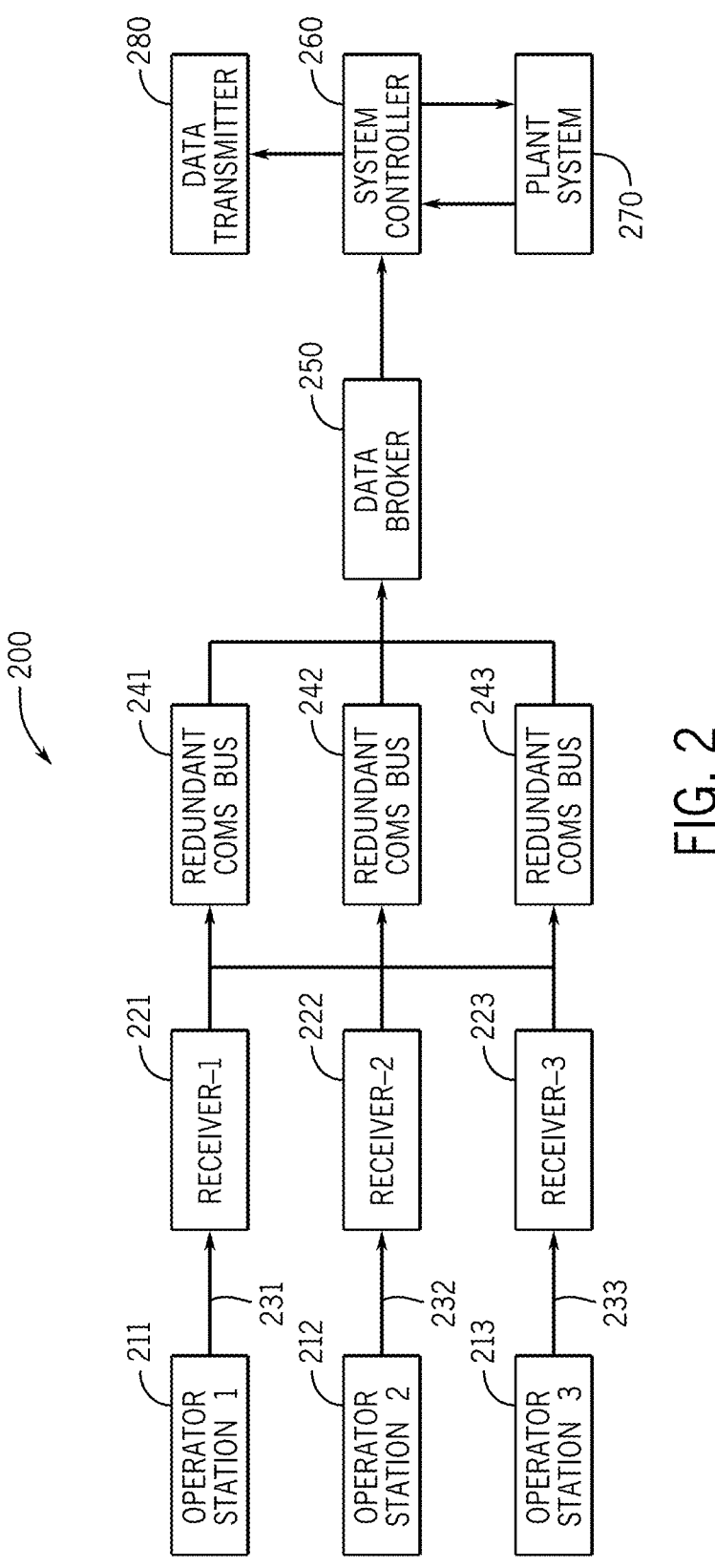
FIG. 2 depicts another schematic block diagram of an example secure system for controlling semiautonomous critical systems and infrastructure.

FIG. 2 illustrates another example schematic block diagram of an example secure system 200 that controls semiautonomous critical plant system in accordance with some embodiments of the present disclosure. The secure system 200 may be substantially analogous to the secure system 100 described above in relation to FIG. 1. Each operator station 211-213 encrypts and transmits a command signal to a field receiver 221-223 over a communication path 231-233, where the communication path can be wired, wireless, or a combination of both. The field receiver 221-223 further connects a plurality of redundant communications buses 241-243 to propagate the command signal to a data broker 250 in the secure system 200.

In one embodiment, each field receiver 221-223 is equipped with an onboard switch (discussed in FIGS. 6A-6C) that connects a resistor in a supervised circuit. The onboard switch is used to control the status of each field receiver 221-223 by changing the measured resistance in the supervised circuit. For example, when a field receiver 221-223 receives and decrypts an incoming command message, it will detect whether there exists one or more tokens embedded in the message. For example, upon detecting the presence of an authentication token, the field receiver 221-223 will close its onboard switch to introduce measured resistance in the supervised circuit, a bus gate in the supervised circuit may close its onboard switch to allow the field receiver to connect to the plurality of redundant communications buses 241-243 and communicate to the data broker 250. The data broker 250 extracts operations from the command signals and decides what operations will be sent to the system controller 260 to control the semiautonomous critical plant system 270. The system controller 260 is also operatively connected to a data transmitter 280 to communicate with the operator stations 211-213. For example, system controller 260 may capture the operational information of the semiautonomous critical plant system 270 and send it back to operator stations 211-213 for monitor purpose. The implementation of the data broker 250 serves to decouple the actual controller from remote transmissions and limit the scope of controls (i.e., no re-programming).

In some examples, a second authentication token is necessary to pass additional information and/or commands. The field receiver 221-223 and/or bus gate may be programmed to detect compromises or faults and decommission themselves based on the detection of the second authentication token.

Figure 3:
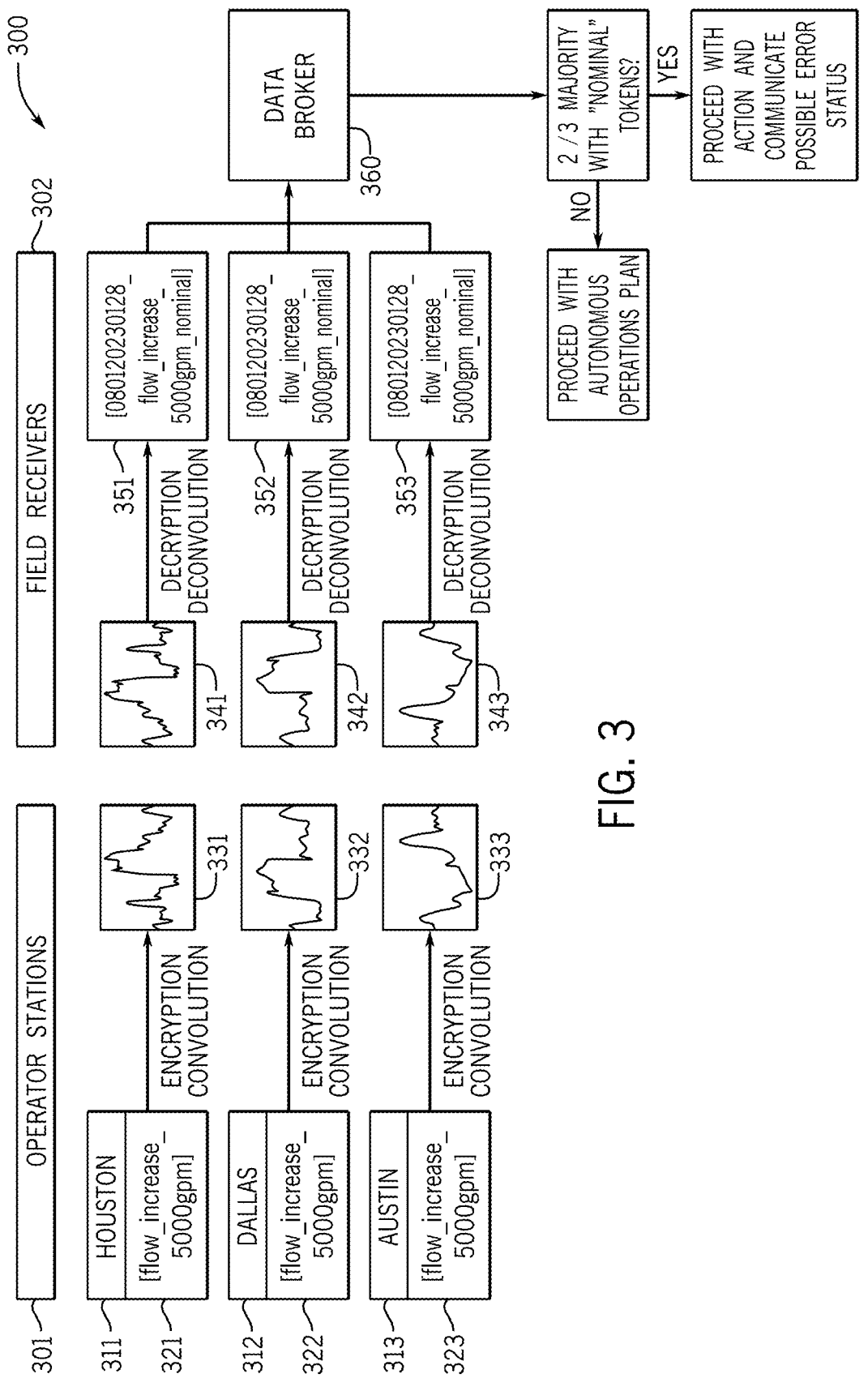
FIG. 3 depicts another schematic block diagram of an example secure system capable of sending and receiving command signals that control semiautonomous critical systems and infrastructure.

Turning to FIG. 3, a schematic block diagram illustrating an example secure system 300 capable of sending and receiving command signals is disclosed. The secure system 300 may be substantially analogous to the secure system 200 illustrated in FIG. 2. The secure system 300 includes three operator stations 301 located in three different geographic locations: Houston 311, Dallas 312, and Austin 313. As shown in the FIG. 3, in the transmitter side, all the operations stations 301 convert the same operation command "flow_increase_5000 gpm" 321-323 from a human-readable message to an analog signal 331-333 through encryption and convolution. Due to different cryptograph algorithms applied by the operations stations 301, the converted analog signals 331-333 are with different waveforms, in terms of frequencies, amplitudes, and phases. In the receiver side, three field receivers 302 receive and convert the analog signals 341-343 back to digital command signals 351-353 through decryption and deconvolution. Each of the digital command signals 351-353 normally includes a timestamp indicative of received time, an operation command to be executed, an authentication token, and a nominal token. The presence of both the authentication token and the nominal token would trigger the bus gate in the supervised circuit to close and allow communication. Data broker 360 receives the digital command signals from all the field receivers 302 and applies a majority rule based on the nominal tokens in the command signals to decide how to process the operation command. Each nominal token would communicate the root authenticity of each operation command, which allows us to ascertain more as attackers approach a true breach.

For example, if the data broker 360 detects that two of three digital command signals contain the nominal tokens, it will proceed with action to execute the operation command, e.g., "flow_increase_5000 gpm," in the plant system 270 and communicate possible error status with the operations stations 301. Otherwise, the data broker 360 may proceed with autonomous operation plan in the plant system 270.

Figure 4:
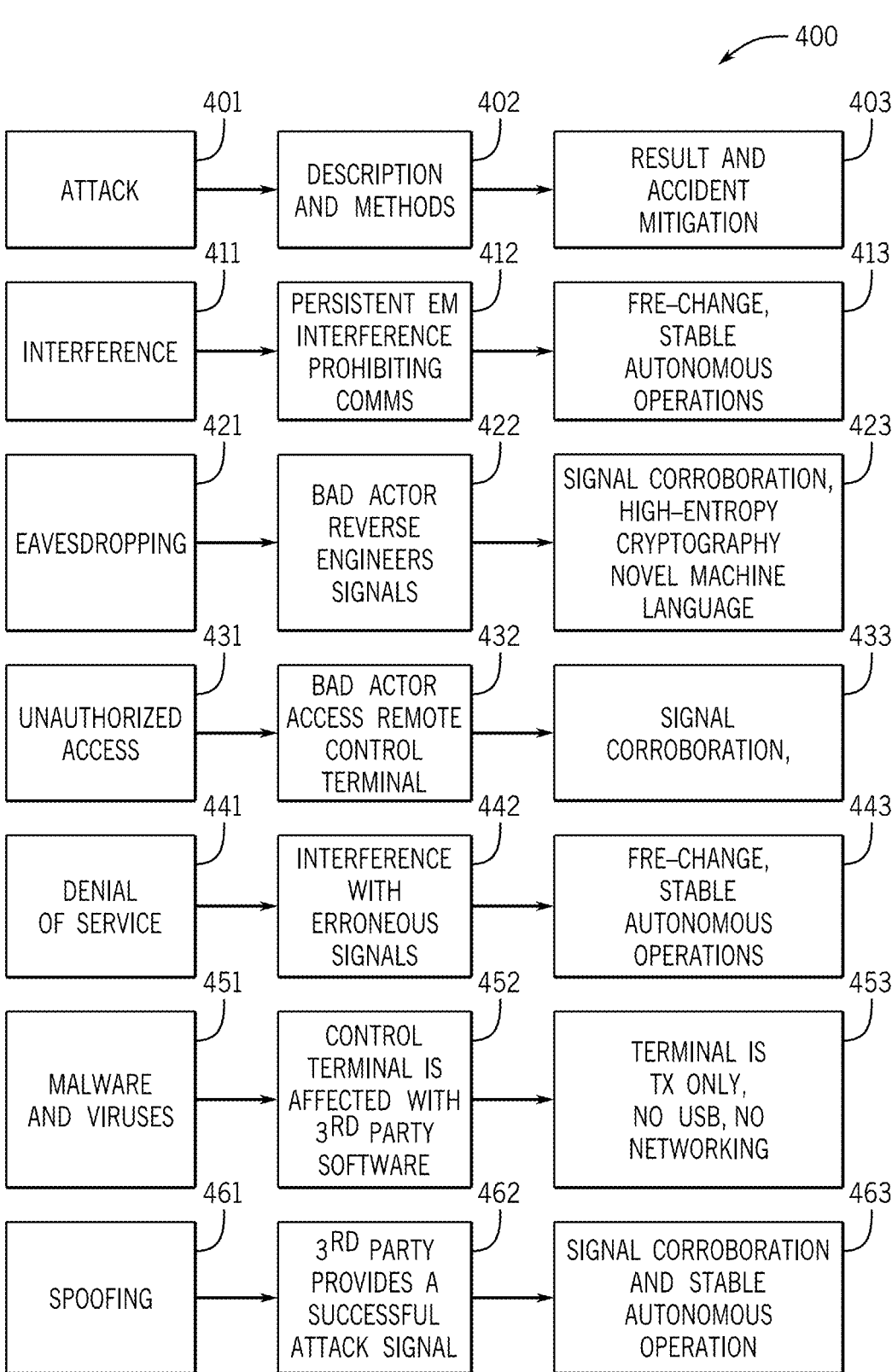
FIG. 4 depicts a threat matrix with a plurality of attack types, descriptions of attacks, and associated mitigation approaches deployed in an example secure system.

FIG. 4 illustrates a threat matrix 400 with a plurality of attack types, descriptions of attacks, and associated mitigation approaches deployed in the example secure system 100. In each attack 401, the system is estimated to remain within safe operational behavior. For example, interference 411 may be caused by persistent electromagnetic (EM) spectrum. It is usually generated by an external source and may occupies a large number of frequencies that overlap with the carrier frequency of the command signal, resulting in prohibiting the communication of the command signal over the communication link. To mitigate the interference, the example secure system 100 may deploy frequency hopping technique to change carrier frequencies for signal transmission and use stable autonomous operations resilient to noise and jamming attacks 413.

In another example, a bad actor may intercept the command signal in transmission and recovered the signal through reverse engineering techniques. This may cause eavesdropping risk 421 to the secure system 100. Some example mitigation approaches include signal corroboration, high-entropy cryptography, and novel machine language 423. In particular, signal corroboration may allow the system to embed timestamp information or one or more token in the command signal to verify and confirm the authenticity and integrity of the signal. High-entropy cryptography may include applications of highly reliable cryptographic algorithms, such as RSA and AES, that are difficult to crack and reverse engineering. Novel machine language may also increase the difficulty of reverse engineering.

In another example, mitigation of unauthorized access 431 may be accomplished through signal cryptography, signal corroboration 433 based on transmission timestamp and other criteria, the utilization of non-networked command stations, and deployment of the command stations within physically secured sites.

In another example, denial of service (DOS) 441 attacks the secure system 100 with a flood of illegitimate signals or traffic that disrupt its normal operations and make its regular service or resource unavailable to its intended users. For example, the DOS attack may overwhelmingly occupy the whole spectrum for signal transmission, such that no more bandwidth is available for transmitting the command signal. To combat the DOS attack, the system may deploy frequency hopping technique to change carrier frequencies to avoid the jammed or congested spectrum occupied by the illegitimate signals or traffic and use stable autonomous operations resilient to noise and jamming attacks 443.

Regarding malware and virus risk 451 that comes from 3rd party software, the system may place terminals at transmitter side only and forbid the use of USB and Internet connection 453, so that the system may be physically isolated and not exposed to the malware and virus.

There is another risk called spoofing 461, which is a deceptive technique that a 3rd party provides a successful attack signal to falsify or manipulate information, identities, or data to deceive the secure system 100. Based on the types of information falsified or manipulated in the attack, spoofing may further include MAC spoofing, IP spoofing, DNS spoofing, email spoofing, GPS spoofing, and the like. To mitigate the spoofing risk, the secure system 100 may apply signal corroboration and use stable autonomous operation 463. For example, the signal corroboration allows the system to embed timestamp information or one or more tokens in the command signal to verify and confirm the authenticity and integrity of the signal. The stable autonomous operation may enhance the system resiliency to the spoofing risk.

Figure 5:
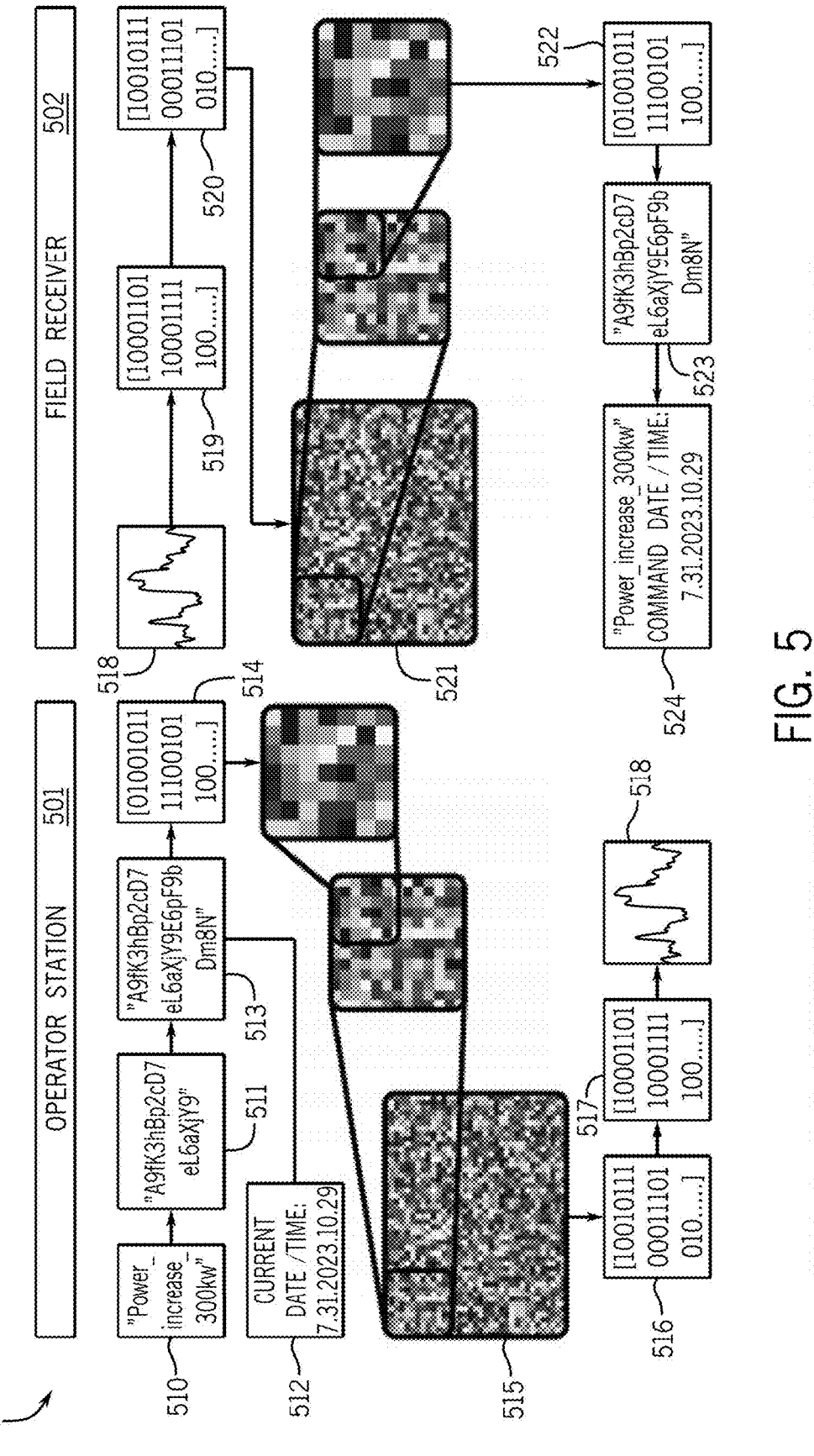
FIG. 5 depicts a conceptual signal flow for a generic operator station and a field receiver within an example secure system.

FIG. 5 depicts a conceptual signal flow 500 for a generic operator station 501 and a field receiver 502 within an example secure system. The signal flow in the operator station 501 starts with initiating a human-readable operation command 510 and translating it into any human/machine unreadable language 511. For example, a command message "Power_increase_300 kw" may be represented by "A9fK3hBp2cD7eL6aXjY9." The translation involves synthesis of command syntax that is unique to each transmitter and receiver pair and bears no correlation to the human/machine-readable instructions. In the meantime, the operator station 501 may translate current date and time information "7.31.2023.10.29" 512 into a human/machine-unreadable language "E6pF9bDm8N" and appended it to the translated command message "A9fK3hBp2cD7eL6aXjY9," resulting in a combined command message "A9fK3hBp2cD7eL6aXjY9E6pF9bDm8N" 513. In some examples, the operator station 501 may also translate and embed one or more tokens in the command message for authentication purpose. Subsequently, the operator station 501 encrypts the combined command message 513 into a binary sequence 514 with one or more cryptographic algorithms used in secret key cryptography, public key cryptography, quantum cryptography, and hash function, such as symmetric key cryptographic algorithms and asymmetric key cryptographic algorithms. For symmetric key cryptographic algorithms, a cryptographic key is usually shared between the operator station 501 and the field receiver 502 via an out-of-the band channel. Example symmetric key cryptographic algorithms include AES. For asymmetric key cryptographic algorithms, the operator station 501 uses field receiver's public key for encryption and the field receiver 502 uses its private key for decryption. Example asymmetric key cryptographic algorithms include RSA. In some examples, the operator station 501 may choose to convert the combined command message 513 into the binary sequence 514 directly without encrypting it with one or more cryptographic algorithms. The binary sequence 514 is then convoluted within a larger data structure 515 to make it difficult for an unauthorized party to detect it. For example, image steganography provides a high level of security by convoluting the binary sequence 514 within an image file to hide the operation command. The operation command may be embedded in one or more different locations within the image file wherein the locations may be determined by a function of timestamp, signal context, or one or more tokens. More concisely, the embedded operation command will not be in the same place(s) during every convolution. This may decrease the likelihood of successful interception by malicious actors. Further, the operator station 501 may embed additional tokens across the one or more locations within the image file to provide authentication. Optionally, a secondary encryption may be performed on the convoluted binary sequence 516. In an analog communication system, the re-encrypted binary sequence 517 is first converted to an analog signal 518 and then transmitted over a communication link to the field receiver. In a digital communication system, the re-encrypted binary sequence 517 can be directly transmitted over the communication link to the field receiver.

As discussed above, the communication link can be wired, wireless, or a combination of both. In some embodiments, the wired communication link may include Internet, fiber-optic communication, and public switched telephone network (PSTN). The wireless communication link may include Wi-Fi, GSM, CDMA, 4G LTE, 5G, and satellite link. During transmission over the communication link, the analog signal 518 may experience noises and interferences.

In an analog communication system, the signal flow in the field receiver 502 starts with the reception of an analog signal 518 containing the command signal. The analog signal 518 is measured by the field receiver 502 and converted to a digital binary sequence 519. In a digital communication system, the signal flow starts with the reception of a digital signal 519 without analog-to-digital conversion. The field receiver 502 then decrypts the binary sequence (or digital signal) 519 based on the decryption key associated with the cryptographic algorithm used by the operator station 501 in the secondary encryption. The decrypted binary sequence 520 is then represented as an image file 521 so that a command data 522 containing the operation command can be retrieved from a deconvolution with the same image file used at the operator station 501, where the image file or any other file with a larger data structure can be pre-installed in the operator station and field receiver pair or shared via an out-of-the band secure communication channel. The command data 522 may be stored across one or more locations within the image file. The retrieved command data 522 is then decrypted in accordance with the one or more cryptographic algorithms used in operator station 501. The decrypted data 523 is not human/machine readable and shares no commonality with implemented machine/code language. The field receiver 502 later recovers and extracts the human/machine readable operation command and its associated timestamp 524 from the decrypted data 523. In the case that the operator station 501 has embedded one or more tokens in the command message or/and in the image file for authentication purpose, the field receiver 502 may also recover the tokens associated with the commend message.

Figure 6A:
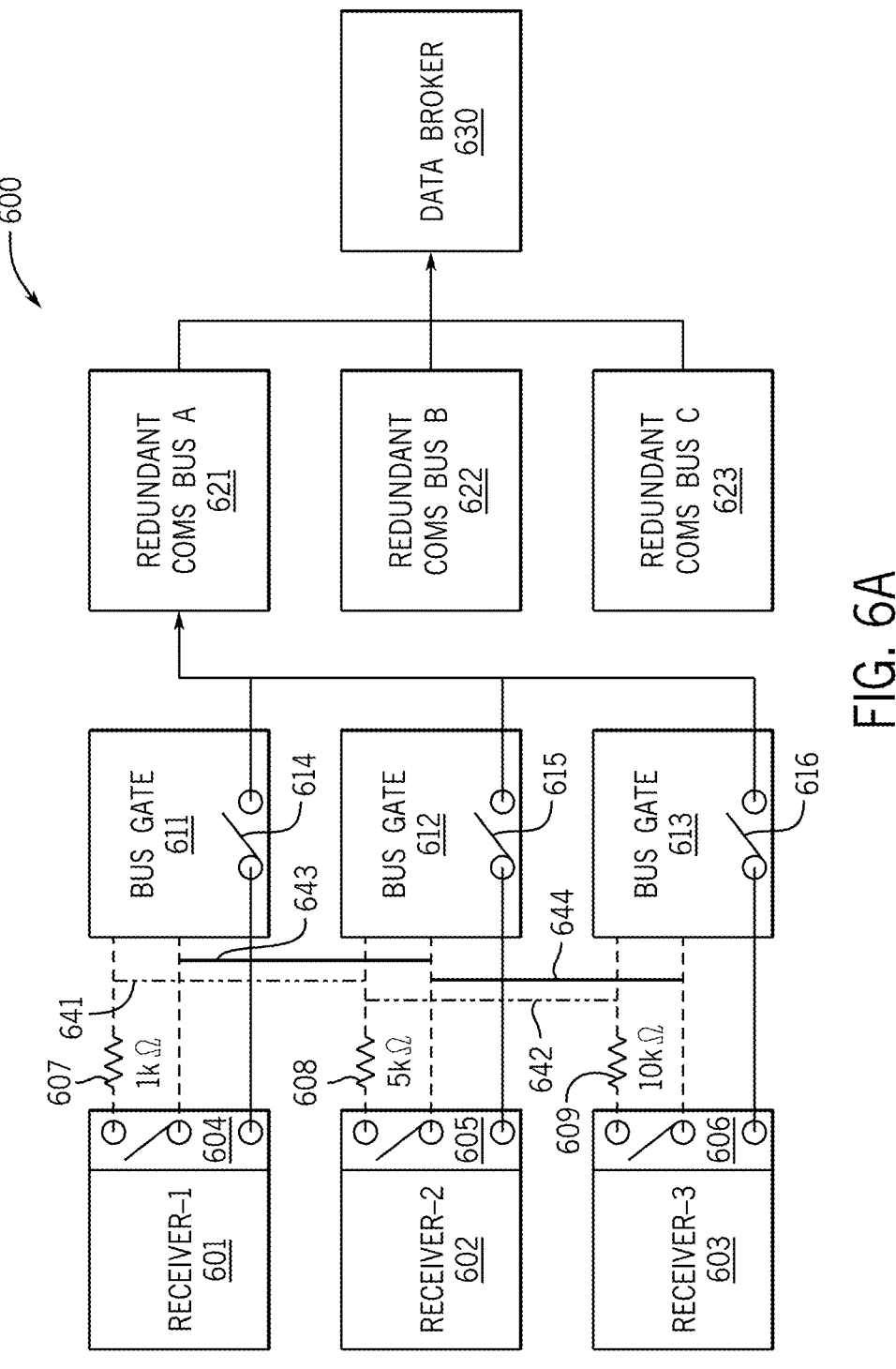
FIG. 6A depicts a supervised circuit implemented to proceed operation commands in a data broker of an example secure system.

With reference to FIG. 6A, a supervised circuit 600 is implemented to proceed operation commands recovered by a plurality of field receivers 601-603. The supervised circuit 600 includes a plurality of field receivers 601-603, a plurality of resistors 607-609, a plurality of bus gates 611-613, a plurality of redundant communication buses 621-623, and a data broker 630. Each field receiver 601-603 is equipped with an onboard switch 604-606 and an electrical resistor 607-609. Circuits 641-644 connect the circuits between the field receives 601-603 and the bus gates 611-613, which allows the bus gates 611-613 to measure "infinite" resistance until a field receiver 601-603 closes its onboard 604-606, at which point they will measure a single resistance or a parallel resistance between two or more resistors 607-609, allowing the bus gates 611-613 to retain omniscience over the field receiver activities. In one example, the supervised circuit 600 may direct electrical current through the resistor 607 by closing the onboard switch 604 of field receiver 601, so that the connected bus gate 611-613 may observe its actions through resistance measurements. Since the magnitude of each electrical resistor 607-609 is unique (e.g., 1 k$\Omega$, 5 k$\Omega$, and 10 k$\Omega$, the status of each field receiver 601-603 remains distinguishable through parallel resistance measurements. For example, onboard switches 604-606 are initially open. When field receivers 601 and 603 close the onboard switches 604 and 606, the measured resistance in the supervised circuit 600 is a parallel resistance between resistors 1 k$\Omega$ and 10 k$\Omega$. Furthermore, the communications lines of each field receiver 601-603 propagate through a bus gate 611-613. Each bus gate 611-613 is equipped with a switch 614-616 and exercises the decision to connect the field receivers 601-603 to the redundant communication buses 621-623. Bus gates 611-613 continuously monitor resistors 607-609 across the system to maintain omniscience across all field receivers 601-603, which when used in conjunction with embedded tokens provides a basis for early comprise detection and fault diagnosis among the receivers. In addition, each bus gate 611-613 can monitor and measure not only the electrical resistor 607-609 of its associated field receiver 601-603, but also field receiver 601-603 associated with its peers via circuits 641-644. For example, in the case of a malfunction at the bus gate 611, bus gate 612 and bus gate 613 may monitor and measure the electrical resistor 607 through parallel circuits 641-644 and decide whether to close the switches 615 and 616 to allow the field receiver 601 to communicate to the redundant communication bus 621 and data broker 630. Each redundant communication bus 621-623 is configured to connect a plurality of field receivers 601-603 via a plurality of bus gates 611-613. The redundant communication buses 621-623 increase signal redundancy to ensure the signal transmission between the field receivers 601-603 and the data broker 630, which ultimately provides instructions to the semiautonomous critical systems and infrastructure.

Figure 6B:
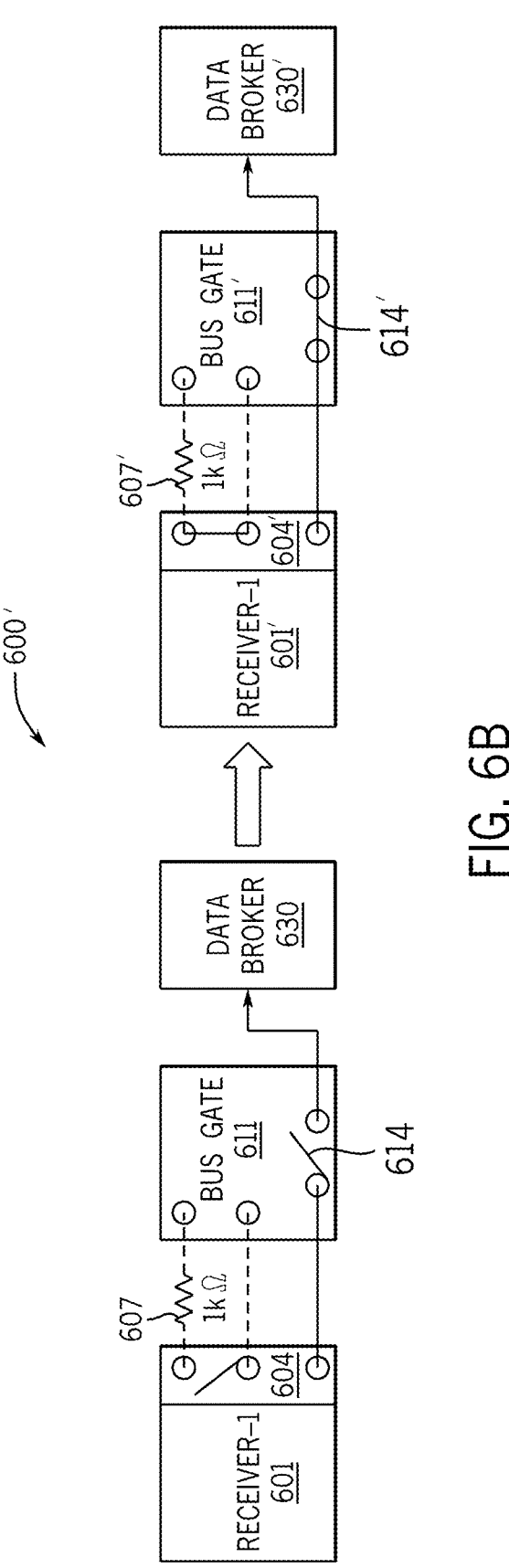
FIG. 6B depicts a supervised circuit implemented to proceed operation commands in a data broker upon reception of an authentication token.

FIG. 6B illustrates a supervised circuit implemented to proceed operation commands in a data broker upon reception of an authentication token. Initially, the field receiver 601 keeps its switch 614 open and the bus gate 611 keeps its switch 614 open. The bus gate 611 is configured to monitor and measure the electrical resistor 607. When the field receiver 601' receives a command signal, it decrypts the signal and detects whether there exists an authentication token embedded in the signal. Upon confirming the reception of the authentication token, field receiver 601' is configured to close the switch 604' to complete an electrical circuit through resistor 607'. The change of the measured resistance may trigger the bus gate 611' to close its switch 614', so that the field receiver 601' can communicate to the data broker 630'. Alternatively, a secondary authentication token can serve as the basis of compromise detection or to pass additional information. The field receiver 601 and/or bus gate 611 may be programmed to detect compromises or faults and decommission themselves.

Figure 6C:
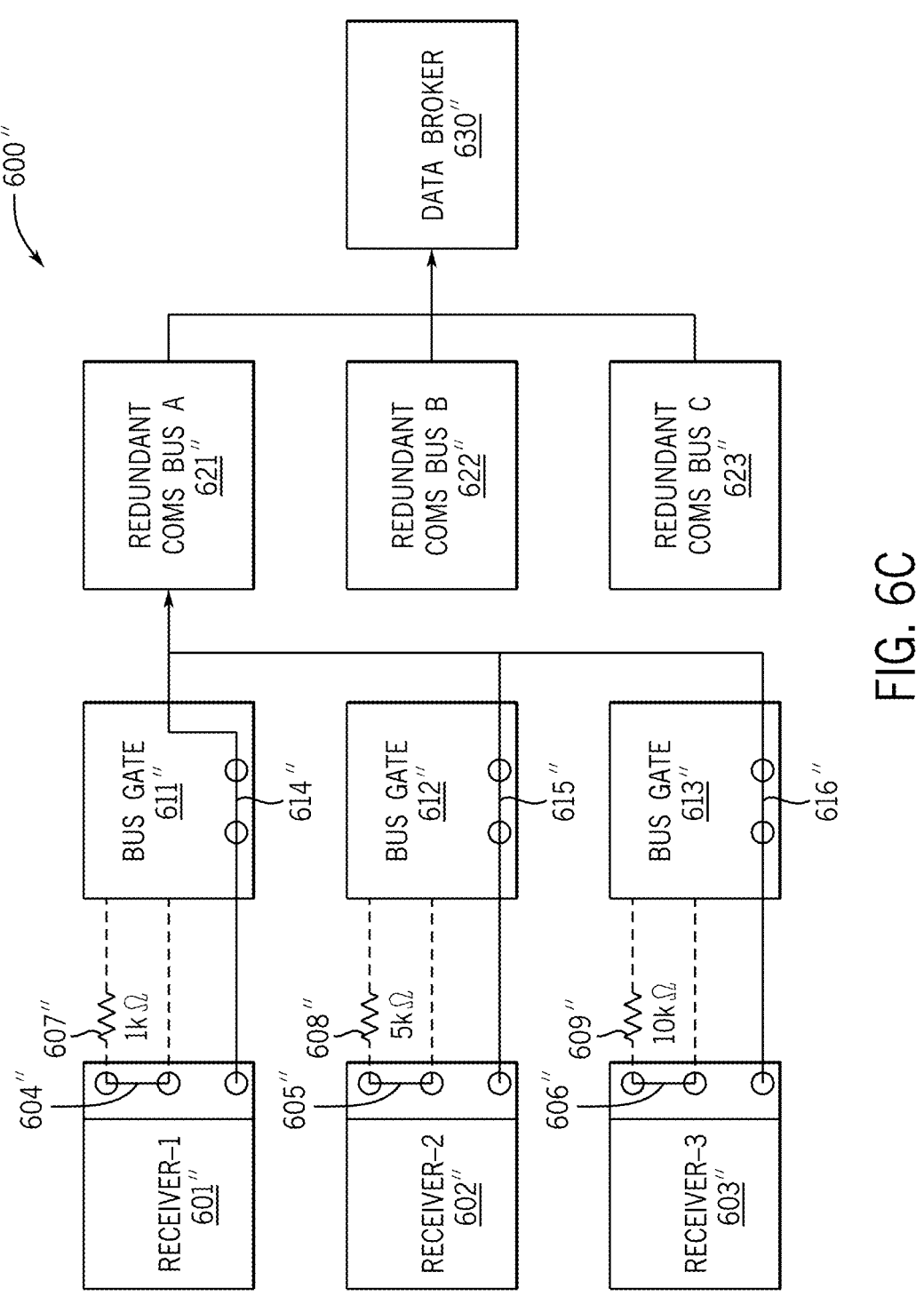
FIG. 6C depicts a supervised circuit implemented to proceed operation commands in a data broker upon reception of a consumable token.

FIG. 6C illustrates another example supervised circuit 600". The supervised circuit 600" may be substantially analogous to the supervised circuit 600 described above in relation to FIG. 6A, except that a consumable token (1-time use) is used to provide a wider scope of operations, such as field reprogramming and updates of the secure system. For example, the consumable token allows all the field receivers 601"-603" and all the bus gates 611"-613" to close the switches 604"-606", 614"-616", so that the field receivers 601"-603" can communicate to the data broker 630" while the consumable token also provides the data broker with authentication to accept a larger subset of commands.

Figure 7:
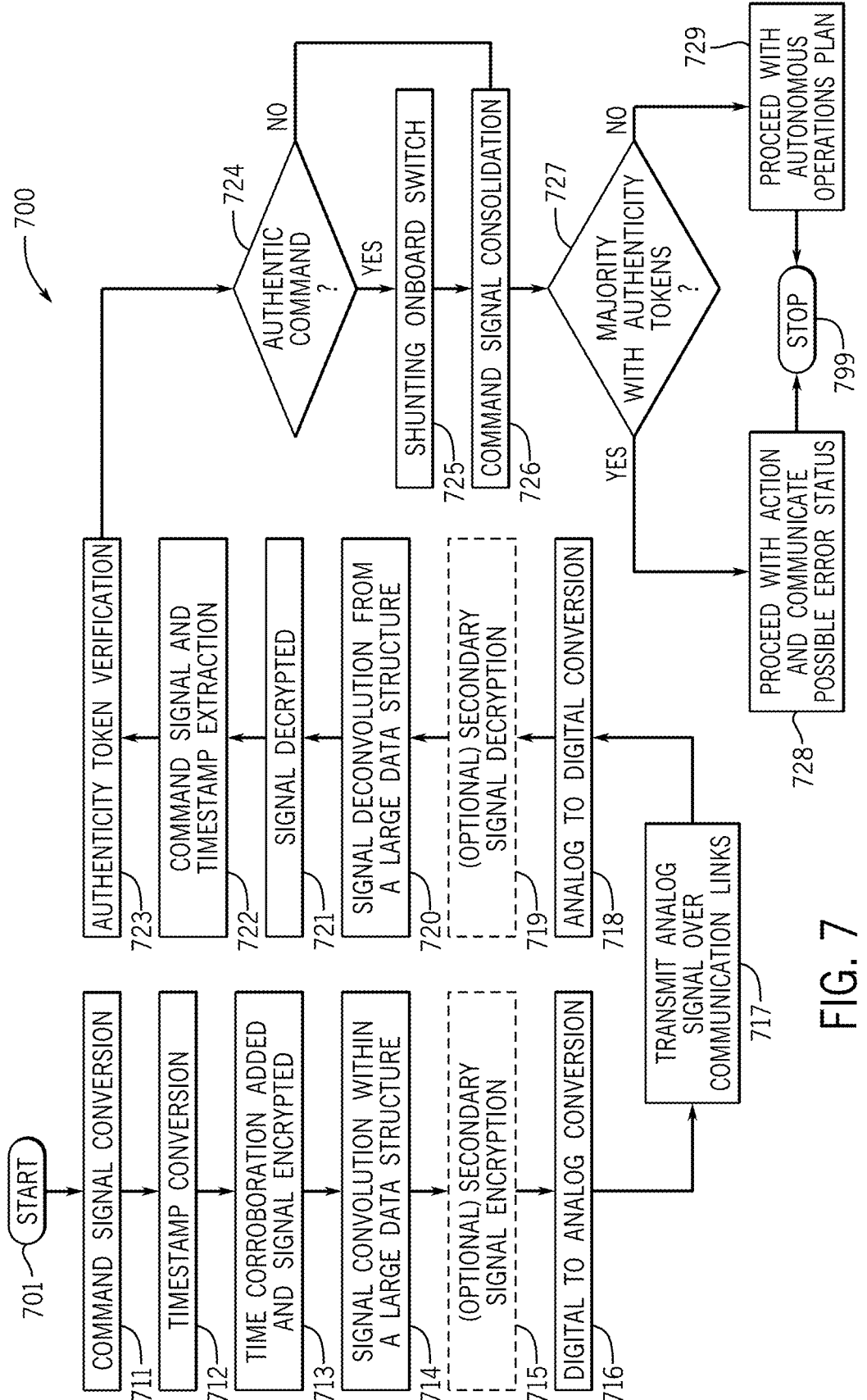
FIG. 7 depicts a flow diagram of an example process of transmitting and receiving command signals in a secure system.

FIG. 7 depicts a flow diagram of an example process 700 of sending and receiving command signals in a secure system that control semiautonomous critical systems and infrastructure. The process 700 starts with 701.

At step 711, an operator station is configured to initiate a command signal and translate it from a human-readable plain text to an unreadable language. The translation involves synthesis of command syntax such that no commands are related. The synthesized human/machine-unreadable language is unique to each operator station and field receiver pair and bear no correlation to human or machine instructions, defeating the basis for conventional decryption-based attacks.

At step 712, the operator station may also be configured to translate, in a subsequent or parallel manner, a timestamp from human-readable format to an unreadable format. The timestamp contains the date and time information of the command signal and is used as a means of signal corroboration to verify the authenticity and integrity of the command signal. The translation may use the same approach used in step 711.

At step 713, the translated timestamp is appended to the translated command signal. In some examples, one or more tokens may also be embedded into the command signal for authentication purpose. In particular, the one or more tokens can be used for hardware-based authentication. The operator station then encrypts the combined signal into a binary sequence, wherein the encryption process may involve one or more cryptographic algorithms used in secret key cryptography, public key cryptography, quantum cryptography, and hash function. Some exemplary cryptographic algorithms may include AES, RSA, and ECC. In some examples, the operator station may choose to convert the combined signal into the binary sequence directly without encrypting it with one or more cryptographic algorithms.

In some examples, the operator station may also append erroneous data, such as human-readable subterfuge data, to the command signal to mislead or confuse potential attackers and make it difficult to decipher and manipulate the command signal. The subterfuge data can refer to any irrelevant content, such as extra character(s), meaningless word(s) or phrase(s), or other obfuscated element(s). In this regard, the erroneous data may enhance privacy and security in the secure system.

At step 714, the operator station convolutes the encrypted binary sequence within a file with a large data structure, such as an image. In the convolution process, the encrypted binary sequence is re-allocated and stored in one or more different locations within the image, making it difficult for malicious actors to intercept and detect the existence of the hidden encrypted binary sequence. In some examples, one or more tokens may also be embedded into one or more locations within the image to enhance security. The locations of the embedded data (e.g., encrypted binary sequence) may be a function of time, signal context, or the tokens. More concisely, the embedded encrypted binary sequence will not be in the same place during every convolution, to decrease likelihood of successful interception. In this regard, the concealment of the encrypted binary sequence may provide another layer of privacy and security to command signals.

At step 715, the operator station may choose to encrypt the convoluted binary sequence with a secondary cryptographic algorithm, wherein the cryptographic algorithm can be selected from a plurality of algorithms used in secret key cryptography, public key cryptography, quantum cryptography, and hash function, such as AES, RSA, and ECC used at step 713. In some examples, step 715 is an optional step that can be skipped.

At step 716, the operator station converts the binary sequence from digital signal into an analog signal for analog communication. The analog signal may be amplified and modulated with a carrier frequency. In one example, the operator station may use frequency hopping technique to change the carrier frequency of the analog signal, making it more challenging for malicious attackers to intercept or jam the signal, as they would need to know the hopping frequencies to capture and decode the signal. In this regard, the transmission of the analog signal becomes more secure and reliable. In another example, the operator station is configured to transmit the binary sequence directly for digital communication without converting it to an analog signal and the step 716 can be skipped.

At step 717, the operator station transits the analog signal to a field receiver over a communication link. The communication link can be wired, wireless, or a combination of both. For example, the wired communication link may include Internet, fiber-optic communication, and PSTN and the wireless communication link may include Wi-Fi, GSM, CDMA, 4G LTE, 5G, and satellite link. During transmission, the analog signal may experience noises and interferences.

At step 718, the field receiver receives a signal containing the command signal from the communication link. In an analog communication system, the received signal is an analog signal, which will be first converted to a digital signal, i.e., a binary sequence. If the frequency hopping technique is applied as discussed at step 716, the field receiver may capture and decode the analog signal based on a predetermined hopping pattern. The predetermined hopping pattern may be shared between the operator station and the field receiver via an out-of-the band channel or any other secure approach. In a digital communication system, the received signal is a digital signal and the step 718 can be skipped.

At step 719, the field receiver may choose to decrypt the converted binary sequence if the operator station has chosen to encrypt the convoluted binary sequence with a secondary cryptographic algorithm. Otherwise, the process 700 can proceed directly to step 720.

At step 720, the field receiver is configured to represent the decrypted binary sequence as a file with a large data structure, such as an image. The field receiver may retrieve command data from the decrypted binary sequence by deconvoluting from the image file, wherein the command data may be stored across one or more locations within the image file.

At step 721, the field receiver is configured to decrypt the command data based on decryption key(s) associated with the cryptographic algorithm(s) used by the operator station at step 713. For example, the cryptographic algorithm(s) may include AES, RSA, and ECC. The decrypted command data may include command signal, timestamp, and one or more tokens, where are in human-unreadable format.

At step 722, the field receiver is configured to extract the command signal and timestamp from the decrypted command data and translate them from human-unreadable format to human-readable format, respectively. The timestamp represents the date and time when the command signal is initiated, which may be used to authenticate the integrity of the command signal.

At step 723, the field receiver may further recover the one or more tokens from the decrypted command data. As discussed at step 713, the tokens can used as a means of hardware-based authentication to confirm the legitimacy of the command signal.

At step 724, if the one or more tokens are legitimate, the field receiver will authenticate the command signal, so that the process 700 will proceed to step 725. Otherwise, the process 700 will proceed to step 726.

At step 725, the field receiver is configured to close its onboard switch to direct electric current through the attached electrical resistor. As illustrated in FIG. 6A, different field receivers are equipped with electrical resistor with different values. This operation may change the measured resistance upon the supervised circuit.

At step 726, the field receiver, along with all the other field receivers, are operatively connect to a data broker via a supervised circuit. The data broker is configured to consolidate a plurality of command signals received from the operator stations via a plurality of bus gates and redundant communication buses. The bus gates are configured to monitor activities of the field receivers and measure the electrical resistor to decide whether to close their onboard switches to allow the field receivers to connect with the redundant communication buses and communicate to the data broker.

At step 727, the data broker is configured to apply a majority rule based on the one or more tokens embedded in the command signals to decide whether to execute the command signal. If there exists a majority with the one or more tokens (e.g., nominal tokens), the process 700 proceeds to step 728. Otherwise, the process 700 proceeds to step 729. Subsequently, the data broker may control to turn off the onboard switches of the bus gates to discard the command signals without legitimate tokens.

At step 728, the command signal prevails, so that the data broker is configured to proceed with action in the command signal and communicate possible error statue. As discussed in FIG. 2, the possible error status may be sent back to the operator station via the data transmitter 280. Then the process 700 ends at step 799.

At step 729, the data broker is configured to proceed with autonomous operations plan and abandon the command signal. In this regard, the data broker may discard all the received command signals. Then the process 700 ends at step 799.

Figure 8:
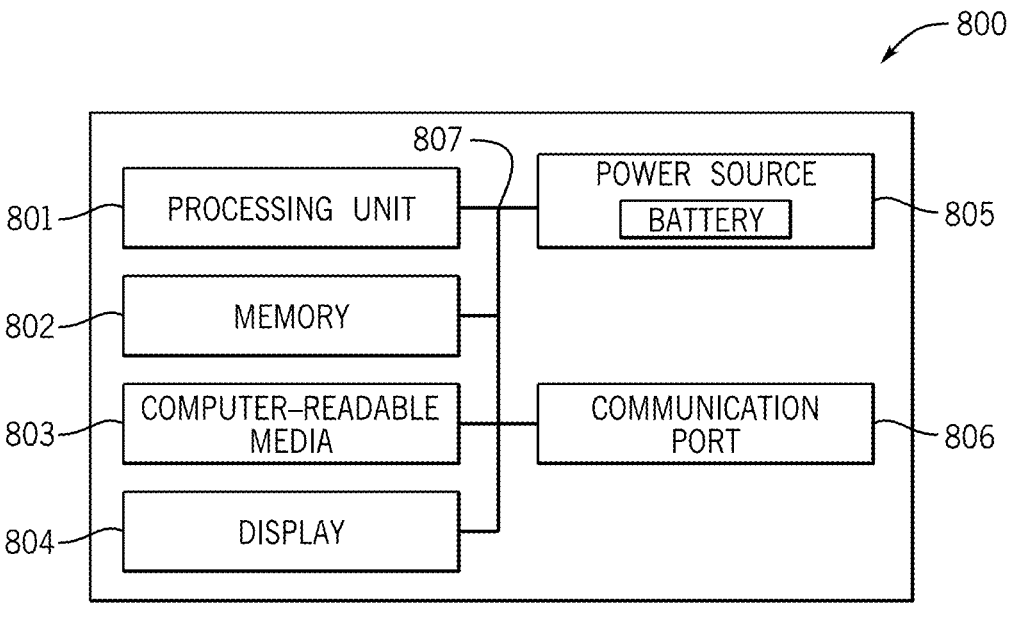
FIG. 8 depicts a functional block diagram of a computing system.

FIG. 8 presents an illustrative computing system 800. The schematic representation in FIG. 8 is generally representative of any types of systems and configurations that may be used for signal procession and communication in accordance with the embodiments described herein. For example, the computing system 800 may be used with or included within any of transceivers, computers, or computer modules described herein. In this regard, the computing system 800 may include any appropriate hardware (e.g., computing devices, data centers, switches), software (e.g., applications, system programs, engines), network components (e.g., communication paths, interfaces, routers) and the like (not necessarily shown in the interest of clarity) for use in facilitating any appropriate operations disclosed herein.

As shown in FIG. 8, the computing system 800 may include a processing unit or element 801 operatively connected to computer memory 802 and computer-readable media 803. The processing unit 801 may be operatively connected to the memory 802 and computer-readable media 803 components via an electronic bus or bridge (e.g., such as system bus 807). The processing unit 801 may include one or more computer processors or microcontrollers that are configured to perform operations in response to computer-readable instructions. The processing element 801 may be a central processing unit of the computing system 800. Additionally or alternatively, the processing unit 801 may be other processors within the device including application specific integrated chips (ASIC) and other microcontroller devices.

The memory 802 may include a variety of types of non-transitory computer-readable storage media, including, for example, read access memory (RAM), read-only memory (ROM), erasable programmable memory (e.g., EPROM and EEPROM), or flash memory. The memory 802 is configured to store computer-readable instructions, sensor values, and other persistent software elements. Computer-readable media 803 may also include a variety of types of non-transitory computer-readable storage media including, for example, a hard-drive storage device, a solid state storage device, a portable magnetic storage device, or other similar device. The computer-readable media 803 may also be configured to store computer-readable instructions, sensor values, and other persistent software elements.

In this example, the processing unit 801 is operable to read computer-readable instructions stored on the memory 802 and/or computer-readable media 803. The computer-readable instructions may adapt the processing unit 801 to perform the operations or functions described above with respect to FIGS. 1-7. The computer-readable instructions may be provided as a computer-program product, software application, or the like.

Still referring to FIG. 8, the computing system 800 may also include a display 804 to display command operations. The display 804 may include a liquid-crystal display (LCD), organic light emitting diode (OLED) display, light emitting diode (LED) display, or the like. If the display 804 is an LCD, the display may also include a backlight component that can be controlled to provide variable levels of display brightness. If the display 804 is an OLED or LED type display, the brightness of the display 804 may be controlled by modifying the electrical signals that are provided to display elements.

The computing system 800 may also include a battery 805 that is configured to provide electrical power to the components of computing system 800. The battery 805 may include one or more power storage cells that are linked together to provide an internal supply of electrical power. In this regard, the battery 805 may be a component of a power source 805 (e.g., including a charging system or other circuitry that supplies electrical power to components of the computing system 800). The battery 805 may be operatively coupled to power management circuitry that is configured to provide appropriate voltage and power levels for individual components or groups of components within the computing system 800. The battery 805, via power management circuitry, may be configured to receive power from an external source, such as an AC power outlet or interconnected computing device. The battery 805 may store received power so that the computing system 800 may operate without connection to an external power source for an extended period of time, which may range from several hours to several days.

The computing system 800 may also include a communication port 1606 that is configured to transmit and/or receive signals or electrical communication from an external or separate device. The communication port 806 may be configured to couple to an external device via a cable, adaptor, or other type of electrical connector. In some embodiments, the communication port 806 may be used as a transceiver of the computing system 800, which is configured to send and/or receive analog signals and convert the analog signals from/to digital signals. The communication port 806 may also be configured to receive identifying information from an external accessory, which may be used to determine a mounting or support configuration. For example, the communication port 806 may be used to determine that the computing system 800 is coupled to a mounting accessory, such as a particular type of stand or support structure.

Other examples and implementations are within the scope and spirit of the disclosure and appended claims. For example, features implementing functions may also be physically located at various positions, including being distributed such that portions of functions are implemented at different physical locations. The foregoing description, for purposes of explanation, uses specific nomenclature to provide a thorough understanding of the described examples. However, it will be apparent to one skilled in the art that the specific details are not required in order to practice the described examples. Thus, the foregoing descriptions of the specific examples described herein are presented for purposes of illustration and description. They are not targeted to be exhaustive or to limit the examples to the precise forms disclosed. It will be apparent to one of ordinary skill in the art that many modifications and variations are possible in view of the above teachings.

What is claimed is:

1. A secure system for sending and receiving command signals that control semiautonomous critical systems and infrastructure, the system comprising:

a plurality of operator stations wherein each operator station is configured to encrypt and transmit a command signal by translating the command signal from a first format to a second format, translating a timestamp from a first format to a second format, embedding the translated timestamp into the translated command signal, encrypting, with a first cryptographic algorithm, the embedded command signal into a first binary sequence, convoluting the first binary sequence within an image file, encrypting, with a second cryptographic algorithm, the image file into a second binary sequence, and sending the second binary sequence over a communication link;

a plurality of field receivers wherein each field receiver configured to receive and decrypt the command signal by receiving a signal containing the command signal over the communication link, wherein the communication link is established by the operator station and the field receiver, decrypting, with the second cryptographic algorithm, the received signal, deconvoluting the decrypted signal from an image file to retrieve an embedded data including the command signal, decrypting, with the first cryptographic algorithm, the embedded data, and recovering the command signal and timestamp from the decrypted embedded data; and a data broker configured to connect with the plurality of field receivers with a supervised circuit, wherein the supervised circuit comprises a plurality of resistors associated with the plurality of field receivers, a plurality of bus gates associated with the plurality of resistors, and a plurality of redundant communication buses associated with the plurality of bus gates, receive a plurality of recovered command signals from the plurality of field receivers, and process the plurality of recovered command signals by using a majority rule.

2. The system of claim 1, wherein encrypting and decrypting with the first cryptographic algorithm is optional;

encrypting and decrypting with the second cryptographic algorithm is optional; and the first cryptographic algorithm and the second cryptographic algorithm are selected from at least one of the cryptographic algorithms used in secret key cryptography, public key cryptography, quantum cryptography, and hash function.

3. The system of claim 1, wherein the first format is a human-readable format and the second format is a human-unreadable format with no observable and translatable relationship to the command signal.

4. The system of claim 1, wherein each operator station is further configured to pad erroneous data that includes human-readable subterfuges in at least one of the command signal, the translated command signal, the embedded command signal, the first binary sequence; the image file, and the second binary sequence; and store the command signal across one or more locations within the image file wherein the one or more locations are changed in each convolution.

5. The system of claim 1, wherein each operator station is further configured to

19 embed one or more tokens
within the command signal; and
across one or more locations within the image file.
6. The system of claim 5, wherein each field receiver is further configured to
close its onboard switch to introduce a measurable resistance in the supervised circuit upon the receipt of the one or more tokens within the command signal; and
connect, via the plurality of bus gates, to the plurality of redundant communication buses for command propagation.
7. The system of claim 1, wherein sending the second binary sequence over a communication link further comprises:
converting the binary sequence to an analog signal; and
sending the analog signal over the communication link.
8. The system of claim 1, wherein receiving a signal containing the command signal over the communication link further comprises:
receiving an analog signal over the communication link; and
converting the analog signal to a digital signal.
9. The system of claim 1, wherein each of the plurality of resistors has a unique value.
10. A method of securely sending command signals, the method comprising:
translating, by an operator station, a command signal from a first format to a second format;
translating, by the operator station, a timestamp from a first format to a second format;
embedding, by the operator station, the timestamp into the translated command signal;
encrypting, by the operator station, the embedded command signal into a first binary sequence with a first cryptographic algorithm;
convoluting, by the operator station, the first binary sequence within an image file;
encrypting, by the operator station, the image file into a second binary sequence with a second cryptographic algorithm; and
sending, by the operator station, the second binary sequence over a communication link, wherein the communication link is established by the operator station and a field receiver.
11. The method of claim 10, wherein the first format is a human-readable format and the second format is a human-unreadable format with no observable and translatable relationship to the command signal.
12. The method of claim 10, wherein
encrypting the embedded command signal into the first binary sequence with the first cryptographic algorithm is optional;
encrypting the image file into the second binary sequence with a second cryptographic algorithm is optional; and
the first cryptographic algorithm and the second cryptographic algorithm are selected from at least one of the cryptographic algorithms used in secret key cryptography, public key cryptography, quantum cryptography, and hash function.
13. The method of claim 10, further comprising:
padding erroneous data that includes human-readable subterfuges in at least one of the command signal, the translated command signal, the embedded command signal, the first binary sequence; the image file, and the second binary sequence; and

store the command signal across one or more locations within the image file where the one or more locations are changed in each convolution.
14. The method of claim 10, further comprising embedding one or more tokens
within the command signal; and
across one or more locations within the image file.
15. The method of claim 10, wherein sending, by the operator station, the second binary sequency further comprising:
converting the second binary sequence to an analog signal; and
sending the analog signal over the communication link.
16. A method of receiving and decrypting command signals, the method comprising:
receiving, by a field receiver, a signal containing a command signal over a communication link, wherein the communication link is established by an operator station and the field receiver;
decrypting, by the field receiver, the received signal with a first cryptographic algorithm;
deconvoluting, by the field receiver, the decrypted signal from an image file to retrieve an embedded data including the command signal;
decrypting, by the field receiver, the embedded data with a second cryptographic algorithm wherein the decrypted embedded data is in human-unreadable format; and
recovering, by the field receiver, the command signal and timestamp in human-readable format from the decrypted embedded data.
17. The method of claim 16, further comprising:
connecting a plurality of field receivers to a data broker with a supervised circuit, wherein the supervised circuit comprises a plurality of resistors associated with the plurality of field receivers, a plurality of bus gates associated with the plurality of resistors, and a plurality of redundant communication buses associated with the plurality of bus gates;
receiving, at the data broker, a plurality of recovered command signals from the plurality of field receivers; and
processing, at the data broker, the plurality of recovered command signals by using a majority rule.
18. The method of claim 17, further comprising:
recovering, at each field receiver, one or more tokens embedded within the command signal and the image file;
closing each field receiver's onboard switch to introduce a measured resistance in the supervised circuit upon confirmation of the legitimacy of the one or more tokens; and
connecting, via the plurality of bus gates, to the plurality of redundant communication buses for command propagation.
19. The method of claim 17, wherein each of the plurality of resistors has a unique value.
20. The method of claim 16, wherein
decrypting the received signal with the first cryptographic algorithm is optional;
decrypting the embedded data with the second cryptographic algorithm is optional;
the first cryptographic algorithm used in the field receiver is the same as the second cryptographic algorithm used in the operator station;

the second cryptographic algorithm used in the field
receiver is the same as the first cryptographic algorithm
used in the operator station; and the first cryptographic algorithm and the second crypto-
graphic algorithm are selected from at least one of the
cryptographic algorithms used in secret key cryptog-
raphy, public key cryptography, quantum cryptography,
and hash function.

* * * * *